United States Patent [19]

Rey

[11] 4,310,829
[45] Jan. 12, 1982

[54] TRANSMITTING DEVICE FOR COMMUNICATIONS EQUIPMENT FOR GENERATING A SIGNAL TO BE SUPERIMPOSED ON AN AC POWER SUPPLY NETWORK

[75] Inventor: Fredy Rey, Dierikon, Switzerland

[73] Assignee: LGZ Landis & Gyr Zug AG, Zug, Switzerland

[21] Appl. No.: 33,303

[22] Filed: Apr. 25, 1979

[30] Foreign Application Priority Data

Apr. 27, 1978 [CH] Switzerland ............... 4569783/78

[51] Int. Cl.³ .................................................... H04B 3/54
[52] U.S. Cl. ...................................... 340/310 A; 332/21
[58] Field of Search ........ 340/310 R, 310 A, 310 CP; 375/69, 71, 61, 62, 43, 44, 50; 455/108–110; 332/9 T, 12, 15, 17, 44, 31 T, 16 T, 21

[56] References Cited

U.S. PATENT DOCUMENTS

| | | | |
|---|---|---|---|
| 3,445,814 | 5/1969 | Spalti | 340/151 |
| 3,488,517 | 1/1970 | Cowan et al. | 340/310 A |
| 3,509,537 | 4/1970 | Haberly | 340/310 A |
| 3,997,973 | 12/1976 | Buss | 337/70 T |
| 4,012,734 | 3/1977 | Jagoda et al. | 340/310 A |
| 4,021,797 | 5/1977 | Hofmeister | 340/310 A |
| 4,031,528 | 6/1977 | Harrison | 340/310 R |
| 4,057,793 | 11/1977 | Johnson et al. | 340/310 R |
| 4,106,007 | 8/1978 | Johnston et al. | 340/310 A |

FOREIGN PATENT DOCUMENTS

| | | | |
|---|---|---|---|
| 2239112 | 2/1974 | Fed. Rep. of Germany | |
| 2545985 | 6/1976 | Fed. Rep. of Germany | |
| 1142975 | 2/1969 | United Kingdom | 340/310 R |

Primary Examiner—James J. Groody

[57] ABSTRACT

A transmitting device for generating communication signals to be superimposed on an AC distribution network. A resonant load circuit coupled to the network conductors includes a capacitor with a transistor switch and reverse polarity diode connected in parallel therewith. Current and voltage threshold circuits control the transistor switch such that an audio frequency communication signal is generated by the load circuit.

15 Claims, 7 Drawing Figures

TRANSMITTING DEVICE FOR COMMUNICATIONS EQUIPMENT FOR GENERATING A SIGNAL TO BE SUPERIMPOSED ON AN AC POWER SUPPLY NETWORK

BACKGROUND OF THE INVENTION

This invention relates to a transmitting device for the generation of a signal for communications equipment, the signal to be superimposed on a network with a network load connected to two conductors of an AC power supply network, the network load being controlled by information-containing signals.

The best known communication equipment superimposes audio frequency power line control on networks. In that system one or a few centrally-located transmitters superimpose audio frequency signals of a narrow band-width on the AC distribution network, which signals are evaluated in many receivers distributed about the network for the carrying out of orders of various types. Speed of transmission, and therefore the amount of information transmitted in a time unit, is relatively small in the case of audio frequency power line control equipment.

Also known are installations which are similar in many respects to that described below, through which, for example, the meter readings of meters distributed about the network, or information on the successful carrying out of orders in the audio frequency power line control system, can be reported back to a power plant. The report then is carried in the direction opposite to the flow of the network power; the amount of information is large and many transmitters with relatively small power are needed for the report back. These transmitters must be inexpensive, but only one or a few centrally-located receivers are needed for the report-back information, and these receivers may be expensive.

Thus it has been proposed to report the use of fixed amounts of energy, gas, water or the like, by means of orders triggered by audio frequency power network signals for the momentary coupling of an oscillating circuit between two network conductors in the individual meters, and using the signals thus produced in a receiver in the power plant which contains extremely accurately discriminating electronic filters. A transmitter of the type mentioned above and suitable for this purpose has also been described. This transmitter generates resonance oscillations in the oscillating circuit tuned to audio frequencies which fade out after a few cycles. The amplitude of the oscillations in this oscillating circuit, and in the network it feeds, is therefore not constant.

Extensive theoretical research and practical experiments have shown that for these purposes, transmitters and corresponding receivers which work with broad-band signals are better suited. Such signals can be easily separated from network interference and evaluated with the aid of noise filters and limiters. A device which is suitable for the generation of broad-band and also any narrow-band signals is described in U.S. patent application Ser. No. 863,468, filed on Dec. 22, 1977. The band-width of these signals is controlled and determined by the comparative size of the current flowing through the network load, which preferably consists of a series circuit containing an oscillating coil and a capacitor and an adjustable comparison current. If the momentary value of network voltage is taken as a further comparative value, then signals whose frequency increase and decrease in a sine wave pattern during a single half-cycle of the network frequency in a preferably audio frequency range from 2000 to 20000 Hz can be generated.

The purpose of the instant invention is to expand the scope of the above-mentioned invention with respect to safe and simple operations. The instant invention is directed to the simple generation of manifold signal forms with optimum spectral distribution or for the purpose of obtaining special code forms.

BRIEF DESCRIPTION OF THE DRAWINGS

The invention is described in greater detail below on the basis of the accompanying drawings, in which.

DETAILED DESCRIPTION OF THE INVENTION

Figure 1:
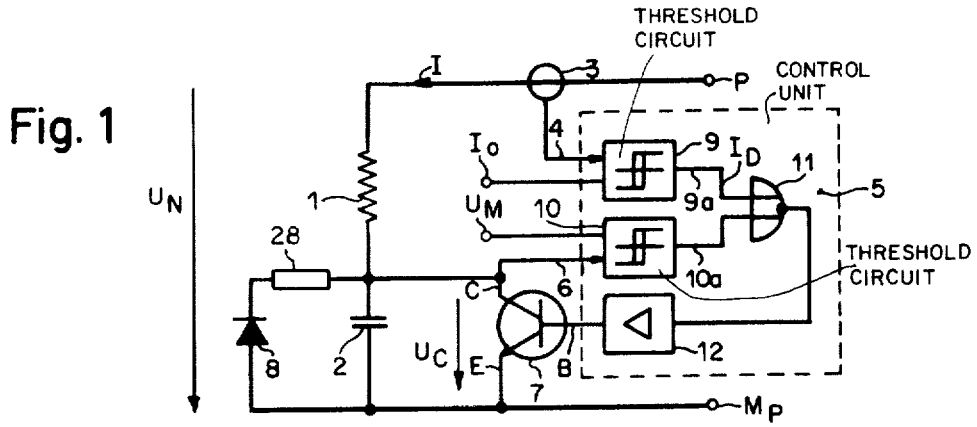
FIG. 1 depicts a first transmitter circuit according to the instant invention.

The transmitter device according to FIG. 1 consists of a resonant circuit connected permanently as a load between a network conductor P and a ground conductor $M_p$, the resonant circuit consisting of a resonant circuit coil 1 and a capacitor 2. The network conductor P is provided with a current measuring winding 3 which is connected to the terminal 4 of a control unit 5. A further terminal 6 of the control unit 5 is connected to the connection point between the resonant circuit coil 1 and one plate of the capacitor 2. The second capacitor plate is connected to the ground lead $M_p$. The control unit 5 controls a power transistor 7 connected between the junction point of the capacitor 2 with the resonant circuit coil 1, and the ground lead $M_p$, with base B, emitter E and collector C. The transistor 7 is thus connected in parallel with the capacitor 2. A series circuit consisting of a resistor 28 and a diode 8 is also connected in parallel to the capacitor 2 and to the transistor 7 but it is connected across collector-emitter junction C-E in the reverse direction of current flow.

The network voltage between power conductor P and the ground conductor $M_p$, and therefore across the series resonant circuit consisting of the resonant circuit coil 1 and capacitor 2, is designated $U_N$; the current flowing through this circuit is designated I, and the voltage across the capacitor 2 is designated $U_C$. The current flowing in the current measuring winding 3 is proportional to the current I.

An adjustable current source which is not depicted provides a comparison current $I_o$, which can be compared to the current in the current measuring winding 3 in a threshold circuit 9 in the control unit 5. By means of a further threshold circuit 10 in the control unit 5, the voltage $U_C$ between the terminals of capacitor 2 can be compared with a reference voltage $U_M$ from a voltage source which is not depicted. The output 9a of the threshold circuit 9 for current, and output 10a of the threshold circuit 10 for voltage, are connected with the inputs of a NOR-gate 11. The output of the NOR-gate is connected to the input of an amplifier 12 which controls transistor 7. In order to prevent the negative half-cycle of the network voltage from having to be suppressed, the resistor 28 is designed as a load resistor through which the negative half-wave can be discharged via diode 8.

Figure 3:
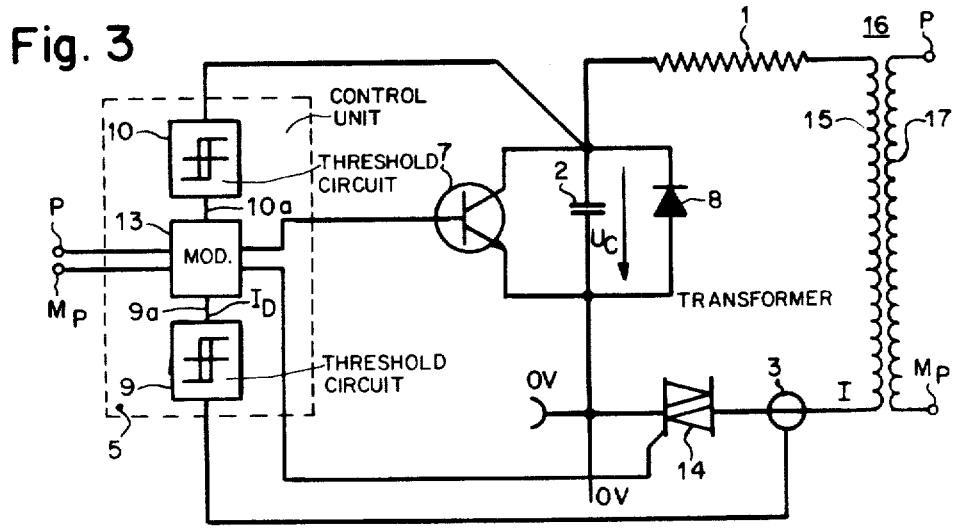
FIG. 3 depicts a second transmitter circuit.

More advantageous from the point of view of energy utilization and safety is the transmitter device shown in FIG. 3. In addition to the features of FIG. 1, control unit 5 includes a modulator 13; also, in parallel with the series resonant circuit consisting of resonant circuit coil 1 and the capacitor 2 there is a series circuit consisting of an electronic switch, for example a Triac 14, and a primary winding 15 of a transformer 16. The Triac 14 can, analogous to the transistor 7 and the diode 8, be replaced by a power transistor with a diode connected across its collector-emitter junction C-E in the reverse direction of current flow. The secondary winding 17 of the transformer 16 is connected to the power conductor P and the ground conductor $M_p$. Its stray inductivity may even replace the resonant circuit coil 1. The current measuring winding 3 can, in this case, be connected between the Triac 14 and the primary winding 15.

Figure 4:
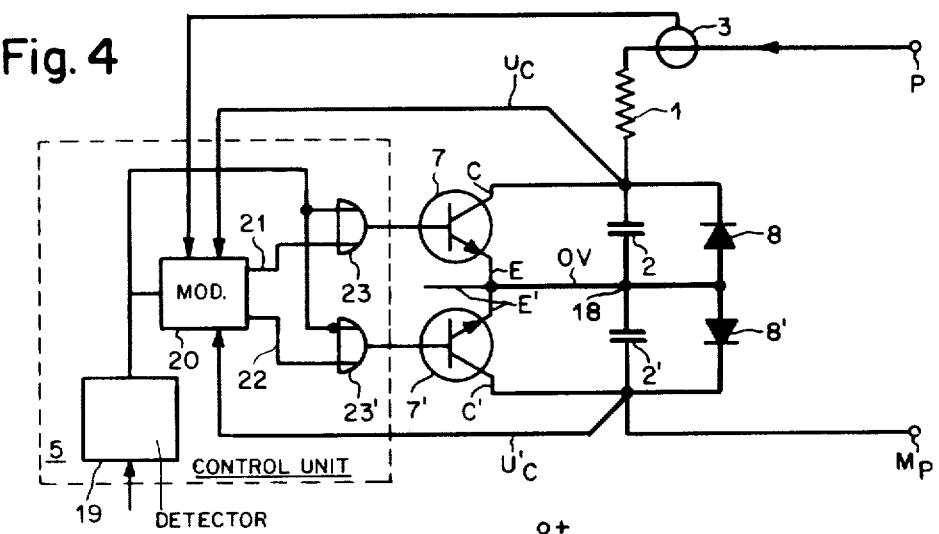
FIG. 4 shows a third transmitter circuit.

In the transmitting device of FIG. 4, between the network conductors P and $M_p$ there is connected a series resonant circuit consisting of the resonant circuit coil 1 and two capacitors 2 and 2' connected in series. The junction point 18 between these capacitors 2 and 2' is connected to a lead OV at zero potential with respect to all circuit components. This lead OV connects the emitters E and E' of two power transistors 7 and 7' connected in opposition, and it connects the anodes of two diodes 8 and 8'. The collector C of transistor 7 and the cathode of diode 8 are connected to the junction point of the resonant circuit coil 1 and capacitor 2. The collector C' of transistor 7' is connected to the cathode of the diode 8' and a plate of the capacitor 2' with the ground lead $M_p$. The control unit 5 in this case consists of a half-wave detector 19; a combined multiplexer, threshold switch, and modulator 20 with outputs 21 and 22; and the OR gates 23 and 23' whose inputs are connected to outputs 21 and 22, respectively, with the half-wave detector 19, as shown. With respect to OR gate 23', one input is inverted.

Figure 5:
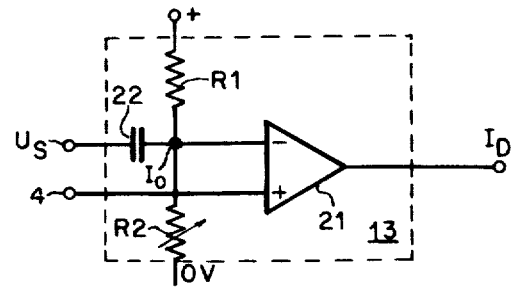
FIG. 5 depicts a modulator circuit.

Modulator 13 of FIG. 5, which works analogously, consists of a comparator 21, the first input of which is provided with a voltage proportional to the comparison current $I_o$ by means of a voltage divider consisting of the fixed resistor R1 and the adjustable resistor R2; the comparator is also provided with a modulation voltage $U_S$ superimposed upon it, fed preferably through a capacitor 22. The second input is provided with a voltage proportional to current I (at terminal 4).

Figure 7:
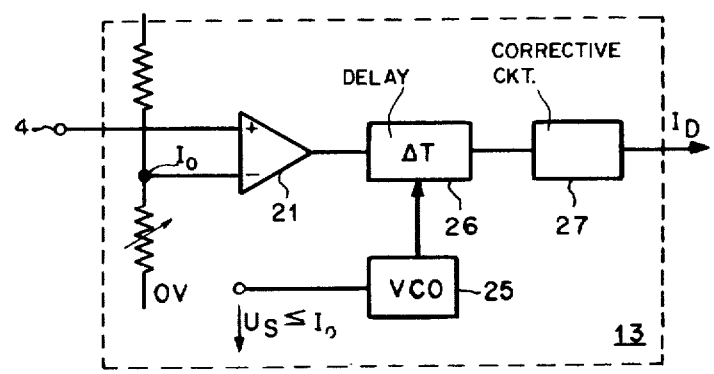
FIG. 7 depicts a digital modulator circuit.

The digitally-functioning modulator 13 of FIG. 7 consists of the comparator 21, a digital delay unit 26 controlled by a voltage-controlled oscillator 25, and possibly a corrective circuit 27.

The mode of operation of the transmitting device of FIG. 1 is explained below on the basis of the current-/voltage diagram of FIG. 2.

In both figures, the following symbols are used:
I: Current through coil 1
$I_o$: Threshold current
$U_N$: Network voltage
$U_C$: The voltage across capacitor 2
$U_M$: The reference voltage
$I_D$: Control signal
T: Cycle duration of the signal current
$T_O$: The cycle duration of the resonant frequency of the oscillating circuit
$t_S$: The part of T during which the diode 8 and the transistor 7 block $t_L$: The part of T during which the diode 8 or the transistor 7 conduct.

By means of the current measuring winding 3, the threshold circuit 9 monitors the current I and provides at output 9a a logic signal $I_D$=H in the case where I is greater than or equal to the adjusted threshold current $I_o$ and a logic signal $I_D$=L for the case where I is less than $I_o$. In an analogous fashion there appears at output 10a of the threshold circuit 10 for voltage an H signal when the voltage $U_C$ across the capacitor 2 exceeds the reference voltage $U_M$ and an L signal when the voltage $U_C$ is less than or equal to $U_M$. The NOR-gate 11 is thus closed when an H signal is present at the output of the threshold circuit 9 for current and/or threshold circuit 10 for voltage, so that the transistor 7 blocks. The transistor 7 conducts when an L signal appears at the outputs of both threshold circuits 9 and 10, since then an H signal is present at the output of the NOR-gate 11.

In the following it is initially assumed that the reference voltage $U_M$=0. The circuit then functions as follows:

At the beginning of a cycle T, the current I reaches the adjusted value $I_o$ and the voltage $U_C$ across capacitor 2 exceeds $U_M$. At the output of NOR-gate 11 there is therefore an L signal which causes the transistor 7 to block. The current I in the oscillating circuit coil 1 now flows into capacitor 2. The current I and the voltage $U_C$ in the now free-resonanting circuit consisting of coil 1 and capacitor 2, run approximately in a sine wave configuration with time as shown in FIG. 2 during the time period $t_S$. The next time the voltage $U_C$ passes through zero at the end of the time period $t_S$, the current I flows through diode 8 until the current changes its sign. Since now both threshold circuits 9 and 10 have L signals at their outputs 9a and 10a, the transistor 7 will conduct until the end of the period $t_L$. In this period $t_L$, the current I therefore starts out negative and then increases exponentially until the value $I_o$ is reached at the end of the period $t_L$ and thus, at the end of the cycle T. Then the transistor 7 blocks again due to 9a, so that voltage can build up across the capacitor again and the cycle begins again. This applies, however, only during the positive half cycle of network voltage. The negative half cycle is short circuited across resistor 28 and coil 1. The time required by the current I to reach the threshold $I_o$ depends, on the one hand, on the momentary value of the voltage $U_N$ and on the other hand upon the amount of inductivity L of the resonant circuit coil 1. The following equation applies:

$$\omega_o = 1/\sqrt{L.C}$$

The interval T is clearly longer than $T_o$. Thus it is obvious that the signal frequency f=(1/T) is directly dependent upon the network voltage and, as a result, the time period T changes essentially in a sine wave configuration. The transmitting device according to FIG. 1 is thus suitable for supplying a signal with pre-selectable band-width when operated in accordance with FIG. 2.

This dependence of the relationship $f/f_o$ is determined by the parameter $$u = (U_N/\omega L I_o)$$

and is therefore dependent upon $\omega$, L and upon the adjusted threshold current $I_o$.

For large values of u, that is to say for small values of $I_o$, L or ω, the frequency change is small; for small values of u, a broader band signal appears.

Figure 2:
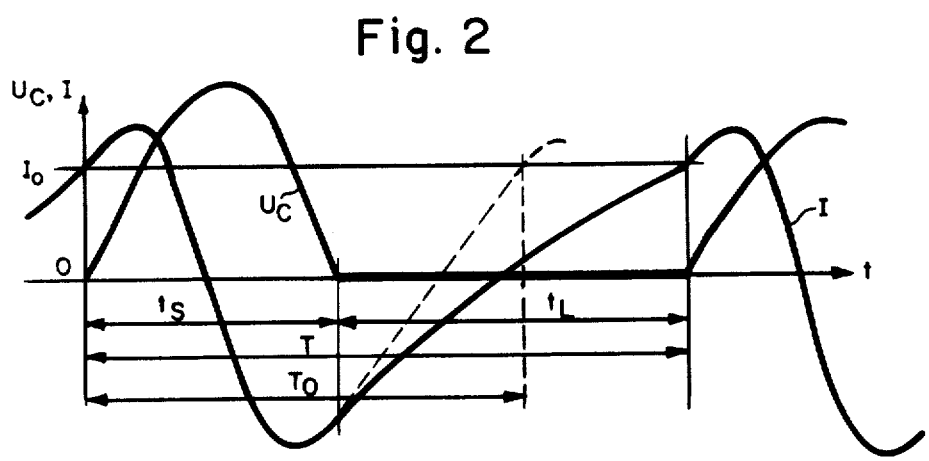
FIG. 2 is a current/voltage diagram.

Since the threshold $I_o$ is freely adjustable within certain limits, control in accordance with FIG. 2 can result in frequency deviations during a half-cycle of the network; these deviations can identify different logical conditions which can be transmitted through the network conductors.

The frequency modulated broad-band signal is especially suitable for the transmission of meter readings or other information, by means of numerous transmitting devices distributed over the network, in the opposite direction from the direction of power flow to one or more receivers in a central power plant for the determination of such information. The transmitting units are simple and low in cost, since they can be made of a few semiconductor building blocks. When the frequency deviation has a certain form, the signals received can be compressed in time and/or frequency and detected in accordance with the device described in U.S. Patent Application Ser. No. 863,467, filed on Dec. 22, 1977, by means of a demodulator adjusted to the modulator in the transmitting unit. Since the noise on the transmission line is generally distributed discretely according to frequency throughout the signal spectrum and the noise impulses are discrete in time through the duration of the signal, a suitable noise filter makes it possible to design in the receiver a safe, sensitive data transmission system with a high signal-to-noise ratio, since the interference signals there have a significantly lower level than the signals after noise filtering and compression.

The examples describe practical models where the network load is connected directly between the network conductors. These transmitting devices can therefore generate very powerful signals. However, the energy consumption for the control of the generation of oscillations in the control unit 5 is very small. It comes only to a few tenths of a percent of the signal energy generated and requires no large power supplies for signal generation.

The transmitting device according to FIG. 1 functions only during a half-cycle of a network. The coupling of the transmitting device to the network conductors, P, $M_P$ can be done through a transformer. This variation has the advantage that smaller voltages are built up across the capacitor when the transformation ratio is chosen so that the voltage is higher on the network side, so that there is a transformation ratio from the oscillator side to the network side of n:1 where n is between 0.1 and 0.5. Further, it allows the isolation of the transmitting device from the network.

The transmitting device shown in FIG. 3 represents a special embodiment of the previously-discussed device. Here, the design of the control unit differs from that of FIG. 1, and the addition of a Triac in the connection between the series resonant circuit and the primary winding 15 of the transformer 16, provide further advantages.

Control unit 5 of FIG. 3, unlike that of FIG. 1, is controlled both by the threshold circuits 9 and 10 and by a modulator 13 connected to the phase conductor P and the ground conductor $M_p$. This makes it possible to generate signals which deviate more or less markedly from the sine wave configuration during a half wave of the network voltage, as will be explained in greater detail with the aid of FIGS. 4 through 7.

The modulator 13 is also equipped with a control circuit through which the Triac conducts only during a certain part of the network half-wave; for example, in the case of a fiftycycle half wave, after a delay of 2 ms. after the passage of the network half wave through zero, and which blocks again after a delay of 8 ms. This provides effective protection against a short-circuit through the Triac 14 and the diode 8 during the negative half-wave. The secondary winding 17 of the transformer is connected between the phase winding P and the ground lead $M_p$, as was the case in the previously discussed design.

In this case, transformer 16 is connected in series with the series resonant circuit which consists of the resonant circuit coil 1 and capacitor 2. Its stray inductance therefore enters into the total inductance. The transformer can be left unchanged in the case of a change in the basic frequency of the transmitting device, and only the inductance of the resonant circuit coil must be changed in the case of a change in the basic frequency; this design of the transmitting unit is especially advantageous if it is done in a modulator manner. In this case, the resonant circuit coil 1 can be identical for all basic frequencies, and for the individual basic frequencies $f_o$ appropriate wired taps can be provided.

The transmitting device shown in FIG. 4 permits the use of both half-waves of the network for the control of the network load 1, 2 and 2'; during one half-cycle of the network the first power transistor 7 and the second diode 8' conduct and during the second half-wave of the network the second transistor 7' and the first diode 8 conduct. The two capacitors 2 and 2' connected in series with the resonant circuit coil 1 then alternatively accept the charge 8 with respect to the zero potential conductor OV.

The half-wave detector 19 which is connected to the network conductors provides an L signal at its output during each positive half cycle. The multiplex modulator 20 controlled by this, by the voltages $U_C$ and $U'_C$ across the capacitors 2 and 2', and by the current through the current measuring winding 3 provides an H signal at its output 21 during the first network half-wave and at its output 22 during the second network half-wave. The OR gate 23, and the OR gate 23' which has an inverted input, therefore start the transistors 7 and 7' alternately during both half waves. Preferably a circuit can be provided in the multiplexer/modulator 20 to provide intermittent starting during only one or some network half-waves for a coded impulse.

The zero potential OV lead of the power parts consisting of the two capacitors 2 and 2', the two transistors 7 and 7', and the diodes 8 and 8', should preferably be insulated from the zero potential lead of the control unit 5. Similarly, in this case the control unit 5 and the power part should be electrically insulated, for example by means of optical couplings.

The analog operating modulator 13 represented in FIG. 5 which supplies the modulation of the current $I_o$ for the control unit in FIG. 1, or which serves as an integral part of the control unit 5 of the transmitting device in FIG. 3 or 4, consists essentially of a comparator 21 whose inverting input is fed with a voltage proportional to the adjustable current $I_o$ which is superimposed upon a modulation voltage proportional to network voltage through a capacitor 22. At the other input (+) the voltage proportional to I of terminal 4 is connected. The modulator input voltage can be generated by means of any network voltage-synchronized signal generator. In this manner, with the aid of the transmission devices according to FIGS. 1, 3 and 4, broad-band signals can be generated in which the frequency changes during a signalling period of 10 ms., corresponding to a half-wave on the network in accordance with the forms shown in FIG. 6. Such signals can be detected and used perfectly by means of the above-described receivers. In this manner, signal forms with optimum spectral distribution and/or significant signals for special code forms can be generated.

In the digitally functioning modulator 13 in accordance with FIG. 7, a fixed voltage is first generated at the output of the comparator 21. This is dependent upon a voltage proportional to the reference current $I_o$, preferably of a low value, for example, 20% of the current I, by means of an adjustable resistor. The digital output signal of the comparator 21 is digitally delayed in the delay unit 26 which can, for example, consist of a counter controlled by the voltage-controlled oscillator 25 dependent upon its output frequency. This delay has the effect of raising the threshold of the current $I_o$ in FIG. 2. The voltage-controlled oscillator 25 is started by means of a network synchronized modulator voltage. There is then a resulting beat frequency in the area of 200 to 1800 KHZ. The digital control voltage for the firing of transistors 7 or 7' is taken from the output of the delay circuit 26.

The modulation of the current threshold $I_o$ naturally influences the output current amplitude. This is perfectly permissible within certain limits.

Figure 6:
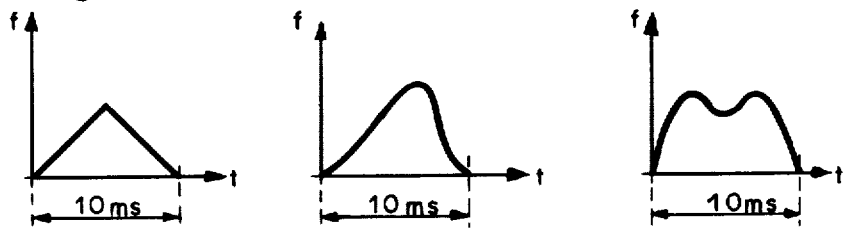
FIG. 6 comprises frequency/time graphs.

The change in network inductance which is in series with the resonating circuit coil 1, however, influences the frequency progression of the signals in accordance with FIGS. 2 and 6. For example, if the network inductance increases, the entire frequency spectrum is moved downward. The opposite occurs with lowering network inductance. An analogous influence can be observed with regard to changes in network voltage. These frequency variations can be compensated for by means of a corrective circuit 27, where at the crest of the network halfwave the desired period length is compared with the actual period length and the corrective circuit 27 correspondingly delays more or less.

What is claimed is:

1. A transmitting device for generating narrow-band or wide-band audio frequency signals superimposed on an AC power supply network comprising:
    a load circuit including a capacitor coupled to the conductors of the AC supply network;
    a transistor switching device connected to said load circuit to periodically couple a component of said load circuit to the conductors of the AC supply network;
    a diode connected in parallel to the collector and emitter junction of said transistor switching device but with reversed polarity;
    a current reference signal;
    a current threshold circuit connected to compare said current reference signal and the value of current flowing through said load circuit;
    a voltage reference signal;
    a voltage threshold circuit connected to compare said voltage reference signal to the voltage appearing across said capacitor; and
    a control unit including said threshold circuits and operatively connected to control said transistor switching device in accordance with the state of said threshold circuits.

2. A device according to claim 1 wherein said control unit further includes a logic circuit comprising a NOR gate.

3. A device according to claim 1 wherein said load circuit is connected to the network through a transformer.

4. A device according to claim 1, wherein said switching device comprises two power transistors, and wherein two diodes respectively are connected in parallel to the collector-emitter junctions of said power transistors in the reverse direction of conductance, said power transistors being connected to conduct on alternate half cycles of the network supply.

5. A device according to claim 1 wherein said control unit contains a modulator controlled by said current and voltage threshold circuits and an input signal determined by the network frequency.

6. A device according to claim 3 wherein said control unit contains a modulator controlled by said current and voltage threshold circuits and an input signal determined by the network frequency.

7. A device according to claim 5 for digital switch control wherein said modulator comprises a comparator for the current reference signal and the momentary load circuit current, a voltage controlled oscillator, and a digital delay device connected to delay the output signal from said comparator by an amount determined by said voltage controlled oscillator.

8. A device according to claim 6 for digital switch control wherein said modulator comprises a comparator for the current reference signal and the momentary load circuit current, a voltage controlled oscillator, and a digital delay device connected to delay the output signal from said comparator by an amount determined by said voltage controlled oscillator.

9. A device according to claim 7 further comprising corrective circuit means placed after the digital delay device in order to compensate for network frequency and voltage influences.

10. A device according to claim 8 further comprising corrective circuit means placed after the digital delay device in order to compensate for network frequency and voltage influences.

11. A device of claim 6, wherein a gatecontrolled semi-conductor switch is interposed between, (a) the node which is electrically common to the emitter of the transistor, the capacitor, and the anode of the diode, and, (b) the primary winding of the transformer.

12. A device of claim 11, wherein the gate-controlled semi-conductor switch is controlled by the modulator.

13. A device according to claim 4 wherein said control unit further comprises a half-wave detector for network frequency and two logic gates each connected to control said power transistors, said half-wave detector being operatively connected to activate said logic gates on alternate half cycles.

14. A device according to claim 5 wherein said modulator comprises a comparator connected to compare a signal proportional to said current flowing through said load circuit to a signal proportional to said current reference signal superimposed upon a signal proportional to the supply network voltage.

15. A device according to claim 6 wherein said modulator comprises a comparator connected to compare a signal proportional to said current flowing through said load circuit to a signal proportional to said current reference signal superimposed upon a signal proportional to the supply network voltage.

* * * * *